US010209905B2

(12) United States Patent
Gong et al.

(10) Patent No.: US 10,209,905 B2
(45) Date of Patent: Feb. 19, 2019

(54) REUSING STORAGE BLOCKS OF A FILE SYSTEM (71) Applicant: EMC Corporation, Hopkinton, MA (US)

(72) Inventors: Chen Gong, Beijing (CN); Junping Frank Zhao, Beijing (CN); Lester Ming Zhang, Beijing (CN); Joe Jian Liu, Beijing (CN); Denny Dengyu Wang, Beijing (CN); Walter Lei Wang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/971,043

(22) Filed: Dec. 16, 2015

(65) Prior Publication Data
US 2016/0196079 A1 Jul. 7, 2016

(30) Foreign Application Priority Data

Jan. 4, 2015 (CN) .......................... 2015 1 0004776

(51) Int. Cl.
G06F 3/06 (2006.01)

(52) U.S. Cl.
CPC ............ G06F 3/0619 (2013.01); G06F 3/065 (2013.01); G06F 3/067 (2013.01)

(58) Field of Classification Search
CPC .... G06F 3/0602; G06F 3/0614; G06F 3/0616; G06F 3/0617; G06F 3/0619; G06F 3/0628; G06F 3/0629; G06F 3/0631; G06F 3/0632; G06F 3/0634; G06F 3/0635; G06F 3/0637; G06F 3/0638; G06F 3/0641; G06F 3/0643; G06F 3/0644; G06F 3/0646; G06F 3/0647; G06F 3/0649; G06F 3/065; G06F 3/0658;
(Continued)

(56) References Cited

U.S. PATENT DOCUMENTS 5,551,003 A * 8/1996 Mattson ................ G06F 3/0601
711/112
7,318,117 B2 * 1/2008 Lee ...................... G06F 12/0246
711/103
(Continued)

OTHER PUBLICATIONS

Optimal placement of high-probability randomly retrieved blocks on CLV optical discs; Ford et al.; ACM Transactions on Information Systems, vol. 9, iss. 1, pp. 1-30; Jan. 1991 (Year: 1991).*
(Continued)

Primary Examiner — Daniel C Chappell
(74) Attorney, Agent, or Firm — BainwoodHuang (57) ABSTRACT Various embodiments of the present invention provide a method and apparatus for reusing a storage block of a file system. The file system is based on a thin provision storage configuration and shares a storage pool with a further file system. The method comprises detecting an unused storage block in a storage space of the file system in response to a predefined trigger event. The method further comprises in response to an unused storage block being detected in the storage space, providing the unused storage block to the storage pool for being reused. According to various embodiments of the present invention, effective utilization of the storage space of the storage pool is achieved.

18 Claims, 6 Drawing Sheets (58) Field of Classification Search
CPC .... G06F 3/0661; G06F 3/0662; G06F 3/0664; G06F 3/0665; G06F 3/0667; G06F 3/067; G06F 3/0671; G06F 3/0673; G06F 3/0674; G06F 3/0676; G06F 3/0677; G06F 3/0679; G06F 3/068; G06F 3/0682; G06F 3/0683; G06F 3/0685; G06F 9/46; G06F 9/50; G06F 9/5005; G06F 9/5011; G06F 9/5016; G06F 9/5022; G06F 9/5027; G06F 9/5033; G06F 9/5038; G06F 9/5044; G06F 9/505; G06F 9/5055; G06F 9/5061; G06F 9/5066; G06F 9/5072; G06F 9/5077; G06F 9/5083; G06F 9/5088; G06F 11/14; G06F 11/1402; G06F 11/1405; G06F 11/1407; G06F 11/141; G06F 11/1415; G06F 11/1417; G06F 11/142; G06F 11/1423; G06F 11/1425; G06F 11/1428; G06F 11/143; G06F 11/1433; G06F 11/1435; G06F 11/1438; G06F 11/1441; G06F 11/1443; G06F 11/1446; G06F 11/1448; G06F 11/1449; G06F 11/1451; G06F 11/1453; G06F 11/1456; G06F 11/1458; G06F 11/1461; G06F 11/1464; G06F 11/1466; G06F 11/1469; G06F 11/1471; G06F 11/1474; G06F 11/16; G06F 11/20; G06F 11/2056; G06F 12/00; G06F 12/02; G06F 12/0223; G06F 12/023; G06F 12/0238; G06F 12/0246; G06F 12/0253; G06F 12/0261; G06F 12/0269; G06F 12/0276; G06F 12/0804; G06F 12/0866; G06F 17/30067; G06F 17/3007; G06F 17/30073; G06F 17/30079; G06F 17/30082; G06F 17/30085; G06F 17/30088; G06F 17/30091; G06F 17/30197; G06F 17/30221; G06F 17/30286; G06F 3/0686; G06F 3/0688; G06F 3/0689; G06F 2212/70; G06F 2212/702; G06F 2212/72; G06F 2212/7201–2212/7211; G06F 2003/0691; G06F 2003/0692; G06F 2003/0694; G06F 2003/0695; G06F 2003/0697; G06F 2003/0698
See application file for complete search history.

(56) References Cited

U.S. PATENT DOCUMENTS

| | | | | |
|---|---|---|---|---|
| 7,454,445 B2* | 11/2008 | Lewis | | G06F 11/14 |
| 8,140,821 B1* | 3/2012 | Raizen | | G06F 11/1448 |
| | | | | 707/637 |
| 8,156,306 B1* | 4/2012 | Raizen | | G06F 3/0608 |
| | | | | 707/813 |
| 8,332,612 B1* | 12/2012 | Raizen | | G06F 3/0608 |
| | | | | 707/813 |
| 8,504,524 B1* | 8/2013 | Chatterjee | | G06F 17/30067 |
| | | | | 707/639 |
| 8,793,556 B1* | 7/2014 | Northcott | | G06F 11/1068 |
| | | | | 365/185.29 |
| 8,819,362 B1* | 8/2014 | Duprey | | G06F 11/2069 |
| | | | | 711/161 |
| 8,881,144 B1* | 11/2014 | Banerjee | | G06F 9/461 |
| | | | | 707/813 |
| 9,176,675 B1* | 11/2015 | Wang | | G06F 3/0619 |
| 9,336,090 B2* | 5/2016 | Takayama | | G06F 3/0604 |
| 2004/0205289 A1* | 10/2004 | Srinivasan | | G06F 12/0246 |
| | | | | 711/103 |
| 2006/0149891 A1* | 7/2006 | Rudelic | | G06F 12/0246 |
| | | | | 711/103 |
| 2007/0156957 A1* | 7/2007 | MacHardy | | G06F 3/0607 |
| | | | | 711/114 |
| 2007/0186065 A1* | 8/2007 | Lee | | G06F 3/0616 |
| | | | | 711/159 |
| 2008/0279005 A1* | 11/2008 | France | | G06F 12/0246 |
| | | | | 365/185.11 |
| 2010/0146039 A1* | 6/2010 | Lo | | G06F 17/3056 |
| | | | | 709/203 |
| 2010/0241820 A1* | 9/2010 | Pelts | | G06F 3/0608 |
| | | | | 711/170 |
| 2012/0047108 A1* | 2/2012 | Mandel | | G06F 3/0607 |
| | | | | 707/639 |
| 2014/0189206 A1* | 7/2014 | Sinclair | | G06F 12/0246 |
| | | | | 711/103 |
| 2015/0186265 A1* | 7/2015 | Maheshwari | | G06F 12/0866 |
| | | | | 711/103 |
| 2016/0231934 A1* | 8/2016 | Gensler, Jr. | | G06F 3/0604 |
| 2017/0031772 A1* | 2/2017 | Subramanian | | G06F 11/1451 |

OTHER PUBLICATIONS

ThinStore: Out-of-Band Virtualization with Thin Provisioning; Qian et al.; IEEE Sixth International Conference on Networking, Architecture, and Storage; Jul. 28-30, 2011 (Year: 2011).*

* cited by examiner

REUSING STORAGE BLOCKS OF A FILE SYSTEM

RELATED APPLICATION

This application claims priority from Chinese Patent Application Number CN201510004776.5 filed on Jan. 4, 2015 entitled "METHOD AND APPARATUS FOR REUSING STORAGE BLOCKS OF A FILE SYSTEM" the content and teachings of which is herein incorporated by reference in its entirety.

TECHNICAL FIELD

Various embodiments of the present invention relate to the field of data storage.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In view of one or more of the above and other potential problems, various embodiments of the present invention provide a method and apparatus for reusing a storage block of a file system.

According to a first aspect of the present invention, there is provided a method for reusing a storage block of a file system. The file system is based on a thin provision storage configuration and shares a storage pool with a further file system. The method comprises detecting an unused storage block in a storage space of the file system in response to a predefined trigger event. The method further comprises providing, in response to an unused storage block being detected in the storage space, the unused storage block to the storage pool for being reused.

In one embodiment of the present invention, the predefined trigger event includes at least one of a user scanning request, time expiration trigger, and storage threshold trigger, the storage threshold trigger being based on at least one of a maximum storage use amount and a current storage use amount of the file system.

In one embodiment of the present invention, the method further comprises updating the maximum storage use amount of the file system after the unused storage block is provided to the storage pool.

In one embodiment of the present invention, detecting an unused storage block in a storage space of the file system comprises scanning the storage space of the file system using a plurality of predefined threads in parallel so as to detect the unused storage block.

In one embodiment of the present invention, providing the unused storage block to the storage pool comprises demapping the unused storage block from the file system and providing the demapped storage block to the storage pool.

In one embodiment of the present invention, before providing the unused storage block to the storage pool, the method further comprises locking the unused storage block with respect to the file system.

In one embodiment of the present invention, the file system supports a snapshot function. In this embodiment, before providing the unused storage block to the storage pool, the method further comprises, in response to the file system having at least one snapshot, determining whether the unused storage block can be reused based on the at least one snapshot.

In one embodiment of the present invention, determining whether the unused storage block can be reused based on the at least one snapshot comprises: detecting whether the unused storage block has a snapshot mapping in the latest snapshot based on a time sequence of the at least one snapshot, the snapshot mapping indicating that data in the unused storage block has been mapped to a further storage block after the snapshot is captured. In this embodiment, when it is detected that the unused storage block has a snapshot mapping, it is determined that the unused storage block can be reused without continuing to detect other snapshots.

In one embodiment of the present invention, the method further comprises: when it is detected that the unused storage block has no snapshot mapping, detecting whether the unused storage block is allocated for storing data at a time point of capturing the snapshot. In this embodiment, when the unused storage block is assigned with data at the time point of capturing the snapshot, it is determined that the unused storage block cannot be reused without continuing to detect other snapshots. In this embodiment, when the unused storage block is not assigned with data at the time point of capturing the snapshot, it is continuously detected whether the unused storage block is allocated for storing data at a time point of capturing a next snapshot.

In one embodiment of the present invention, the method further comprises: when the unused storage block is not assigned with data at the time point of capturing the snapshot and the snapshot is a predetermined snapshot in the at least one snapshot, determining that the unused storage block cannot be reused.

According to a second aspect of the present invention, there is provided an apparatus for reusing a storage block of a file system. The file system is based on a thin provision storage configuration and shares a storage pool with a further file system. The apparatus comprises a storage space scanning unit configured to detect an unused storage block in a storage space of the file system in response to a predefined trigger event. The apparatus further comprises a storage block provisioning unit configured to, in response to an unused storage block being detected in the storage space, provide the unused storage block to the storage pool for being reused.

In one embodiment of the present invention, the predefined trigger event includes at least one of a user scanning request, time expiration trigger, and storage threshold trigger, the storage threshold trigger being based on at least one of a maximum storage use amount and a current storage use amount of the file system.

In one embodiment of the present invention, the apparatus further comprises an updating unit configured to update the maximum storage use amount of the file system after the unused storage block is provided to the storage pool.

In one embodiment of the present invention, the storage space scanning unit is further configured to scan a storage space of the file system using a plurality of predefined threads in parallel so as to detect the unused storage block.

In one embodiment of the present invention, the storage block provisioning unit is further configured to demap the unused storage block from the file system and provide the demapped storage block to the storage pool.

In one embodiment of the present invention, the apparatus further comprises a storage block locking unit configured to lock the unused storage block with respect to the file system before providing the unused storage block to the storage pool.

In one embodiment of the present invention, the file system supports a snapshot function. In this embodiment, the apparatus further comprises a reuse determining unit configured to, in response to the file system having at least one snapshot, determine whether the unused storage block can be reused based on the at least one snapshot before providing the unused storage block to the storage pool.

In one embodiment of the present invention, the reuse determining unit comprises a snapshot mapping detecting unit configured to detect whether the unused storage block has a snapshot mapping in the latest snapshot based on a time sequence of the at least one snapshot, the snapshot mapping indicating that data in the unused storage block has been mapped to a further storage block after the snapshot is captured. The reuse determining unit further comprises a first determining unit configured to determine that the unused storage block can be reused without continuing to detect other snapshots when it is detected that the unused storage block has a snapshot mapping.

In one embodiment of the present invention, the reuse determining unit further comprises a storage data detecting unit configured to detect whether the unused storage block is allocated for storing data at a time point of capturing the snapshot when it is detected that the unused storage block has no snapshot mapping. The reuse determining unit further comprises a second determining unit configured to, when the unused storage block is assigned with data at the time point of capturing the snapshot, determine that the unused storage block cannot be reused without continuing to detect other snapshots.

In one embodiment of the present invention, the storage data detecting unit is further configured to, when the unused storage block is not assigned with data at the time point of capturing the snapshot, continuously detect whether the unused storage block is allocated for storing data at a time point of capturing a next snapshot.

In one embodiment of the present invention, the reuse determining unit further comprises a third determining unit configured to, when the unused storage block is not assigned with data at the time point of capturing the snapshot and the snapshot is a predetermined snapshot in the at least one snapshot, determine that the unused storage block cannot be reused.

According to a third aspect of the present invention, there is provided a computer readable storage medium. The computer readable storage medium has computer readable program instructions stored thereon for performing steps of the method described above.

It would be appreciated through the following description that according to the embodiments of the present invention, an unused storage block is detected by scanning a storage space of a file system. When an unused storage block is detected, the storage block will be returned back into a storage pool such that this storage block can be reused by all file systems that share the storage pool. Therefore, effective utilization of the storage space of the storage pool is achieved.

BRIEF DESCRIPTION OF THE DRAWINGS

Through the more detailed description of exemplary embodiments of the present disclosure with reference to the accompanying drawings, the above and other objectives, features, and advantages of the present disclosure will become more apparent. In the exemplary embodiments of the present disclosure, the same reference numerals always refer to the same components.

DETAILED DESCRIPTION OF THE EMBODIMENTS

Some preferred embodiments will be described in more details below with reference to the accompanying drawings. Although the drawings show the preferred embodiments of the present disclosure, it should be appreciated that the present disclosure may be implemented in various manners and thus should not be limited by the embodiments described herein. On the contrary, these embodiments are provided for thorough and complete understanding of the present disclosure, so as to completely convey the scope of the present disclosure to those skilled in the art.

Figure 1:
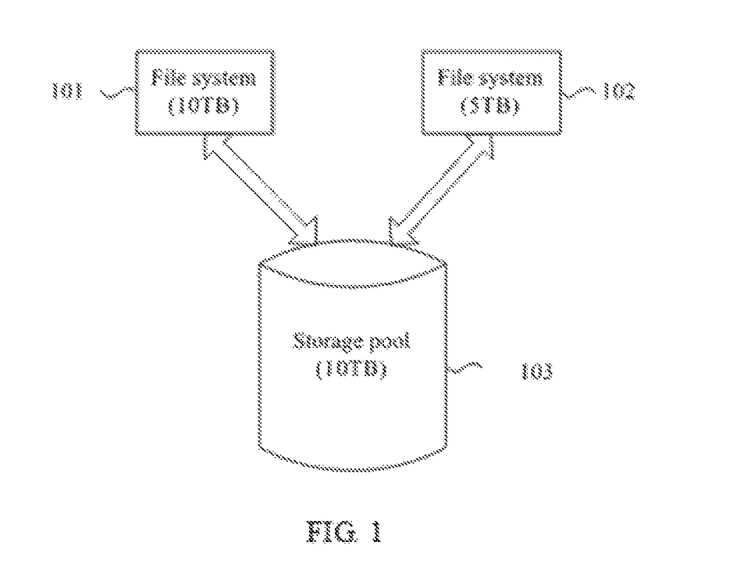
FIG. 1 shows a schematic diagram of a thin provision storage configuration-based storage system.

Traditionally, thin provision storage configuration has been widely applied because it enables a user to effectively use storage space. Typically, in a storage system using the thin provision storage configuration (e.g., thin provisioned LUN (logical unit number) slices), one or more file systems are created based on real storage devices having a certain storage capacity. Generally, the total sum of the sizes of the storage spaces configured for creating the file systems may be greater than the storage capacity of the real storage devices. Conventionally, the storage spaces of the real storage devices may be regarded as a storage pool, and the created file systems share this storage pool based on their real storage requirements. Typically, such configuration facilitates expanding the real storage devices based on the demand of the file system users on the storage capability, without modifying the configurations of the file systems. As shown in FIG. 1, based on the storage pool 103 having a storage capacity of 10 TB, two file systems may be created according to thin provision storage configuration, i.e., a file system 101 having a virtual storage space of 10 TB and a file system 102 having a virtual storage space of 5 TB. The file systems 101 and 102 obtains storage blocks from the storage pool 103 based on the storage requirements to store data.

In a conventional storage system based on thin provision storage configuration, after a first file system obtains a storage block from the shared storage pool for data storage, the storage block will not be utilized by other file systems any more. In other words, even if the data in the storage block is deleted, this storage block cannot be reused by other file systems, but can only be used by the first file system. Generally, in real applications, this is unfavorable for efficient utilization of the storage pool of storage devices. For example, suppose the file system 101 and the file system 102 in the storage system shown in FIG. 1 store 5 TB data, respectively and the storage pool 103 having 10 TB of storage space cannot store more data. In this embodiment, even if a part or all of data of the file system 102 is deleted from the storage pool 103, the file system 101 cannot reuse the storage space of the file system 102 that is not used after the data is deleted, which results in low utilization of the storage space. Conventionally, a solution that can reuse storage blocks of a thin provision configuration-based file system would be beneficial to the data storage industry.

Figure 2:
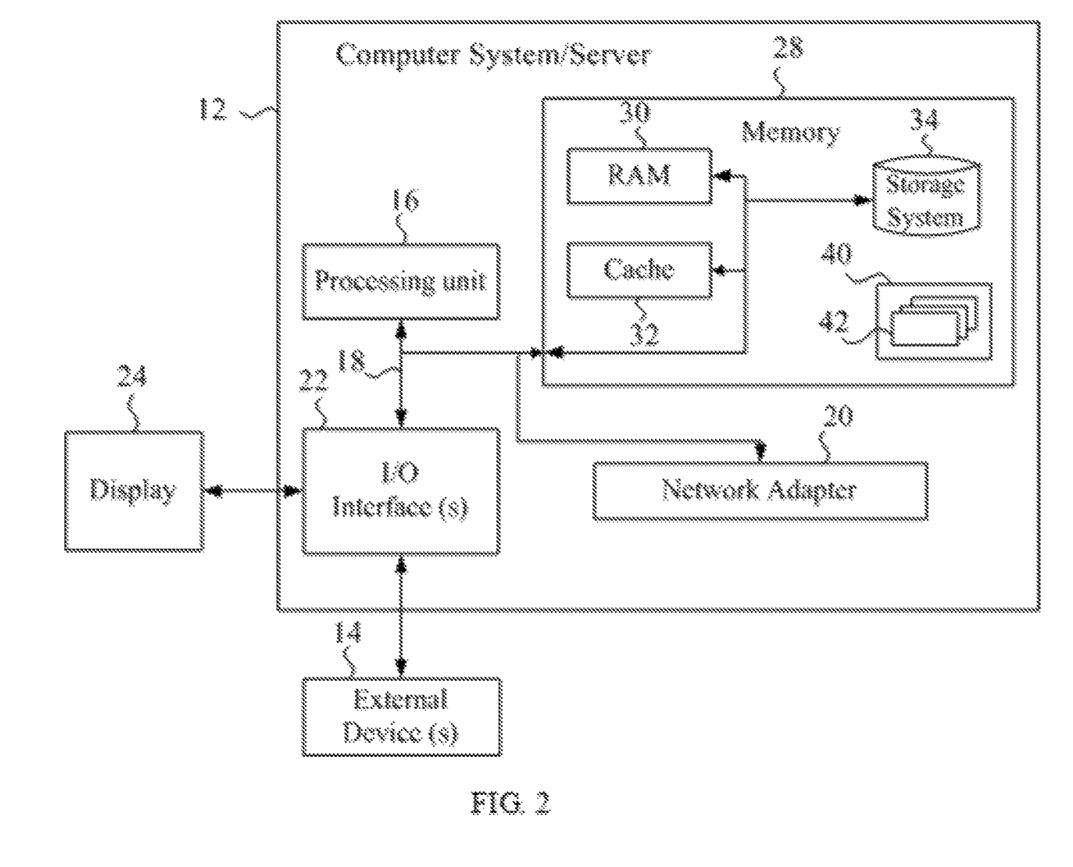
FIG. 2 shows a block diagram of an exemplary computer system/server suitable for implementing embodiments of the present invention.

FIG. 2 shows a block diagram of an example computer system/server 12 suitable for implementing embodiments of the present invention. The computer system/server 12 as shown in FIG. 2 is only an example, which should not be constructed as any limitation to the function and scope of use of the embodiments of the present invention.

As shown in FIG. 2, the computer system/server 12 is shown in a form of a general-purpose computing device. Components of the computer system/server 12 may include, but are not limited to, one or more processors or processing units 16, a system memory 28, and a bus 18 that couples various system components (including the system memory 28 and the processing unit 16).

The bus 18 represents one or more of several kinds of bus structures, including a memory bus or memory controller, a periphery bus, an accelerated graphics port, a processor, or a local area bus using any of a variety of bus architectures. By way of example, such architectures include, but not limited to, an industrial standard architecture (ISA) bus, a micro channel architecture (MAC) bus, an enhanced ISA bus, a video electronics standard association (VESA) local bus, and a peripheral component interconnect (PCI) bus.

The computer system/server 12 typically includes a variety of computer system readable medium. Such medium may be any available medium that is accessible by the computer system/server 12, including volatile and non-volatile medium, removable and non-removable medium.

The system memory 28 may include computer system readable medium in the form of volatile memory, e.g., a memory 30 and/or cache 32. The computer system/server 12 may further include other removable/non-removable, volatile/non-volatile computer system storage medium. Although not shown in FIG. 2, a disk driver for reading from or writing to a removable, non-volatile disk (e.g., a "floppy disk"), and an optical disk driver for reading from or writing to a removable, non-volatile optical disk (e.g., CD-ROM, DVD-ROM, or other optical medium) can be provided. In these cases, each driver can be connected to the bus 18 by one or more data medium interfaces. The memory 28 may include at least one program product having a set (e.g., at least one) of program modules that are configured to carry out the functions of various embodiments of the present invention.

A program/utility tool 40 having a set (at least one) of the program modules 42 may be stored in, for example, a memory 28. Such program modules 42 include, but are not limited to, an operating system, one or more applications, other program modules, and program data. Each or a certain combination of these examples may include an implementation of a networking environment. The program modules 42 generally carry out the functions and/or methodologies of embodiments of the present invention described herein.

The computer system/server 12 may also communicate, as required, with one or more external devices such as a display device 24, a storage device 14 and the like, one or more devices that enable a user to interact with the computer system/server 12, and/or any device (e.g., network card, a modem, etc.) that enables the computer system/server 12 to communicate with one or more other computing devices. Such communication may be performed via an input/output (I/O) interface(s) 22. Still yet, the computer system/server 12 may also communicate with one or more networks such as a local area network (LAN), a wide area network (WAN) and/or a public network (e.g., Internet) via a network adapter 20. As shown in the figure, the network adapter 20 communicates with the other module of the computer system/server 12 via the bus 18. It should be understood that although not shown in the figure, other hardware and/or software components may also be used in conjunction with the computer system/server 12. Examples include, but are not limited to, microcode, device drivers, redundant processing units, external disk drive arrays, RAID systems, disk drivers, data backup storage systems, etc.

In description of example embodiments, the term "includes" and its variants are to be read as open-ended terms that mean "includes, but is not limited to." The term "based on" is to be read as "based at least in part on." The terms "an embodiment" and "the embodiment" are to be read as "at least one embodiment."

Embodiments of the present invention will be described in detail below. It will be appreciated through the description below that one of the basic ideas of the present invention is to detect an unused storage block by scanning a storage space of a file system (the storage block was previously obtained from a storage pool for storing data of this file system, and subsequently, the data in the storage block may be deleted or moved to a further storage block, such that the storage block is idle). When an unused storage block is detected, this storage block is returned back to the storage pool, so that the storage block can be reused by all file systems sharing the storage pool. Therefore, according to the solution of the present invention, unused storage blocks in the file system can be reclaimed for reuse, which enhances the effective utilization of the storage pool.

Figure 3:
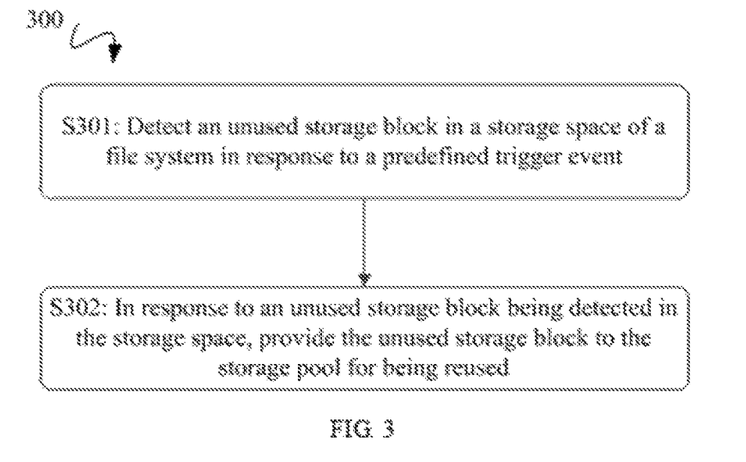
FIG. 3 shows a flowchart of a method for reusing a storage block of a file system according to an embodiment of the present invention.

Reference is first made to FIG. 3, which shows a flowchart of a method for reusing a storage block of a file system 300 according to an embodiment of the present invention. It should be appreciated that the method 300 may further comprise additional steps and/or execution of some shown steps may be omitted. The scope of the present invention is not limited in this regard.

At step S301, an unused storage block in a storage space of a file system is detected in response to a predefined trigger event.

In embodiments of the present invention, a file system is generally based on a thin provision storage configuration and shares a storage pool with a further file system. In one example, the file system may obtain a thin provisioned logical unit (TLU) in the storage pool for storing data. The file system may be a file system 101 or a file system 102 in a thin provision storage configuration-based storage system as shown in FIG. 1, which shares a storage pool 103 with another file system. It should be appreciated that FIG. 1 is only an example. The file system may share the storage pool with many other file systems; and may be configured with greater or less virtual storage spaces. The shared storage pool may have greater or less real storage capacity.

In one embodiment of the present invention, the storage space of the file system (the storage space is a virtual storage space relative to the real storage space of the storage pool) may be comprised of one or more cylinder groups, each of which cylinder groups may include one or more storage blocks (sometimes called sectors). In some examples, each cylinder group may have a storage capacity of, for example, 64 MB, while each storage block may have a storage capacity of, for example, 8 KB to 64 KB. It should be noted that the cylinder group or storage block is a composition unit of the file system, and each cylinder group or storage block may have other storage capacity. The scope of the present invention is not limited in this regard.

In many embodiments, an unused storage block may refer to a storage block of the file system that was previously obtained from the storage pool for storing data and the data in which may be deleted or removed subsequently. In various embodiments, an unused storage block may also be called an idle storage block. Traditionally, in a thin provision-based storage system, idle storage blocks in a file system will not be recognized or automatically returned back into the storage pool for reuse.

In order to reuse these storage blocks so as to enhance the utilization of the storage system, in embodiments of the present invention, the storage space of the file system may be scanned to detect unused storage blocks. In many embodiments, the scanning may be responsive to a predefined trigger event. In some embodiments, the trigger event may be selected or defined by a user of the file system and may include at least one of a user scanning request, time expiration trigger, and storage threshold trigger.

In an embodiment where the trigger event is a user scanning request, the scanning of the file system starts when the user scanning request is received. In this way, the user may trigger the scanning at any time when needed.

In an embodiment where the trigger event is time expiration trigger, a trigger cycle of the scanning may be defined. The trigger cycle may be one day, one week, one month, or the like. Meanwhile, a trigger time frame for performing the scanning may also be defined, for example, as between 0:00 to 2:00. Therefore, when it is detected that the predefined trigger cycle and/or trigger time frame is reached, the file system automatically starts performing the scanning.

In an embodiment where the trigger event is storage threshold trigger, a threshold related to the storage space of the file system may be defined, for example, as a threshold of an available storage capacity (i.e., estimated unused storage capacity) of the file system, and then the scanning is triggered based on this threshold. When it is detected that the current available storage capacity reaches the threshold, the scanning starts. In one embodiment of the present invention, the storage threshold trigger is based on at least one of a maximum storage use amount (high water marker, HWM) of the file system and a current storage use amount. In one example, the available storage amount of the file system may be determined based on the maximum storage use amount and the current storage use amount of the file system, and whether to trigger the scanning is determined based on the comparison between the available storage amount and a predetermined threshold. In one example, the predetermined threshold may be a value with respect to the available storage amount. When the determined available storage amount is greater than or equal to this value, the scanning starts. In another example, the predetermined threshold may be a threshold set with respect to a percentage of the current storage use amount or the current available storage amount to the maximum storage use amount. In a further example, the predetermined threshold may be a threshold set with respect to the percentage of the maximum storage use amount to the storage capacity of the storage pool, or a threshold set with respect to a value of the maximum storage use amount.

In many embodiments, the maximum storage use amount may refer to a high water marker once reached by the file system. For example, if the storage use amount of the file system is 5 TB at a time point T1 and this value is larger than all storage use amounts at any time before the time point T1, then the maximum storage use amount of the file system at the time point T1 is 5 TB, while the storage use amount at the time point is also 5 TB. In various embodiments, if the file system deletes 1 TB data at a time point T2 after T1, then the maximum storage use amount of the file system at the time point T2 is still the use amount 5 TB that is reached once at the time point T1, while the current storage use amount at the time point T2 is 4 TB. In certain embodiments, since the deleted storage space of 1 TB is in an idle state and has not been used, it may be determined that the available storage amount of the file system is 1 TB based on the maximum storage use amount and the current storage use amount. In some embodiments, if the trigger threshold set with respect to the available storage amount is 500 GB, then the scanning of the file system may be triggered.

It should be noted that some examples of the trigger events for triggering the scanning are provided above. In other embodiments, other trigger events may also be employed to trigger the scanning. For example, scanning is triggered in response to data in one or more storage blocks of the file system being deleted. Embodiments of the present invention are not limited in this regard.

It should also be noted that in some embodiments, the scanning of the file system may be initiated in response to a combination of two or more trigger events. For example, the scanning starts when a predetermined period of time is expired and the available storage amount exceeds a predetermined threshold. For another example, a notification is sent to the user when the available storage amount exceeds the predetermined threshold, and the scanning only starts when receiving a user scanning request. The embodiments of the present invention are not limited in this regard.

In most embodiments, when performing the scanning of the file system, the storage space of the file system may be scanned in a unit of cylinder group, so as to find idle storage blocks in each cylinder group. In various embodiments, a preprogrammed thread may be used to scan the storage space of the file system. In one embodiment of the present invention, in order to enhance the scanning speed, a plurality of predefined threads may be used in parallel to scan the storage space of the file system so as to detect the unused storage blocks. For example, in an embodiment, each thread may scan one cylinder group of the file system so as to detect whether the cylinder group has an unused storage block.

Figure 4:
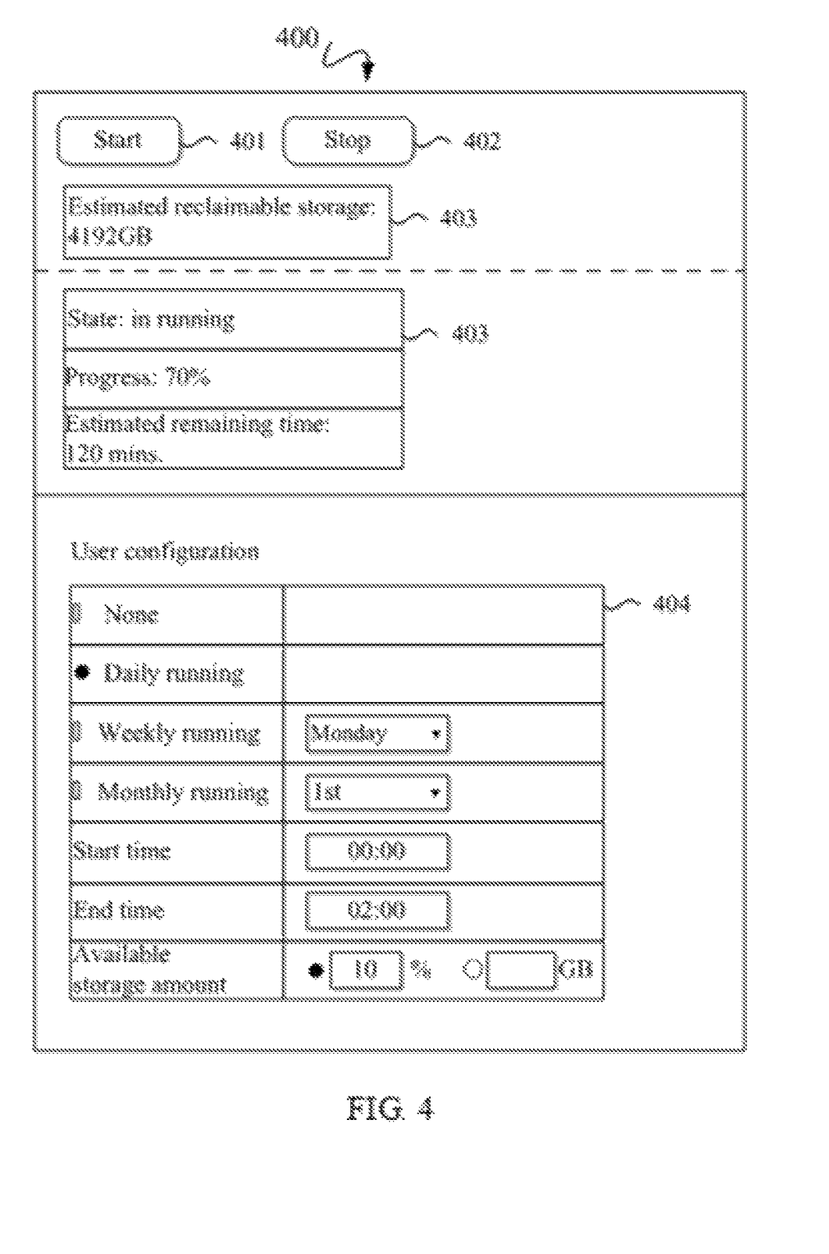
FIG. 4 shows a schematic diagram of a graphical user interface (GUI) for performing scanning a storage space of a file system according to an example embodiment of the present invention.

FIG. 4 shows a schematic diagram of a graphical user interface (GUI) 400 for performing scanning a storage space of a file system according to an example embodiment of the present invention. In the GUI 400, icons 401 and 402 may be clicked by the user to start a scanning process or stop the scanning process. Block 403 shows the current available storage amount of the file system. A status table 403 shows a state of the scanning process, e.g., whether the scanning process is being executed, its execution progress, and estimated remaining time. A user configuration table 404 shows a trigger event that may be customized by the user for triggering a scanning process. As shown in FIG. 4, trigger events for scanning include time expiration trigger and storage threshold trigger. When the available storage amount reaches 10% of the maximum storage use amount of the file system, the file system scanning is performed between 0:00 and 2:00 am each day so as to detect idle storage blocks.

It should be understood that FIG. 4 only illustrates an example graphical user interface. In the use applications, the graphical user interface may be designed into other pattern or may include more or less functions. The embodiments of the present invention are not limited in this regard.

If one or more unused storage blocks are detected at step S301, then the method 300 proceeds to step S302. At step S302, in response to an unused storage block being detected in the storage space, the unused storage block is provided to the storage pool for being reused.

In one embodiment of the present invention, if an unused storage block is detected, the unused storage block is demapped from the file system, and the demapped storage block is provided to the storage pool. For example, when an unused storage block is detected, the file system sends a demapping command (e.g., an "UNMAP" command of SCSI (small computer system interface) to a storage device of the storage pool. The storage device may punch a hole to the storage block so as to demap the storage block from the file system and return it back to the storage pool for reuse.

In many embodiments, during the process of punching a hole to an unused storage block, i.e., after the storage block is detected and before the storage block is put into the storage pool for reuse, in order to prevent the input/output (I/O) thread of the file system from continuing allocation of the storage block, the unused storage block may be locked with respect to the file system such that the locked storage block or the locked cylinder group including the storage block may not be allocated for storing data. In various embodiments, the locking may be a storage block level of locking or a cylinder group level of locking. For example, only the unused storage block is locked, or the cylinder group to which the unused storage block belongs is locked. Therefore, it is ensured that read/write tasks of the file system during the process of reusing the storage block are normal.

In an embodiment of the present invention, after one or more unused storage blocks are provided to the storage pool, those storage blocks may be reused by all file systems that share the storage pool, including the file system previously using the storage block.

Because the detected unused storage block has been demapped from the file system and provided to the storage pool, in one embodiment of the present invention, the maximum storage use amount of the file system is updated such that the maximum storage use amount recorded in the system can reflect a sum of the available storage space and the current storage space use amount. In one example, after all detected unused storage blocks are provided to the storage pool, if there is no new data being stored in the storage space of the file system, then the maximum storage use amount may be updated to be identical to the current storage space use amount.

An example method for reusing a storage block of a file system according to the embodiments of the present invention has been described above with reference to FIG. 3. Various steps of the method may be performed by a computing device running the file system. The computing device may be a computing system as shown in FIG. 2 for example. In some embodiments, the computing device may provide thereon a plurality of file systems. For each of the file systems, the storage blocks may be reclaimed into the storage pool for reuse according to the solutions provided by the embodiments of the present invention.

In some use cases, a file system may support a snapshot function. Snapshot refers to a mirror of the file system at some time point (sometimes, it is called a check point). For example, a snapshot of the file system may indicate data stored in the file system at the time point when the snapshot is captured, storage location of the data, other aspects of the file system, and the like. Since a snapshot of the file system at a certain time point may refer to data in a storage block, in an embodiment of the present invention, during the process of performing reuse of the storage block, snapshots of the file system may also be considered. In one embodiment of the present invention, before providing an unused storage block to the storage pool, i.e., before the step S302 of the method 300, it may be determined whether the file system has a snapshot, and in response to the file system having at least one snapshot, it is determined whether the unused storage block can be reused based on the at least one snapshot.

When it is determined whether an unused storage block can be reused, it is mainly considered a snapshot mapping of this storage block and whether the storage block is allocated for storing data at the time point of capturing the snapshot.

An unused storage block may probably have a snapshot mapping in each snapshot. The snapshot mapping indicates that data in the unused storage block have been mapped to a further storage block after the snapshot is captured and before a next snapshot is captured. In other words, for a snapshot in question, if a certain storage block referred by this snapshot has been allocated for storing data when the snapshot is captured and the data in this storage block are modified (e.g., replaced by new data) after the snapshot is captured, then the original data in the storage block will be written into other storage space designated by the snapshot. In this case, this storage block is recorded as having a snapshot mapping. In other words, the data in the storage block referred by the snapshot already have backup in other space. In this case, if the data in the storage block are subsequently deleted (i.e., this storage block becomes an unused storage block), then the storage block can be reused.

Information about the allocation time of a storage block may be used for determining whether the storage block has been allocated for storing data at a time point when a snapshot is captured. For example, if a certain storage block is not allocated for storing data at a time point of capturing a snapshot, then when the storage block is allocated for storing data subsequently and the data therein are then deleted (i.e., this storage block becomes an unused storage block), the storage block may be reused. The reason lies in that the snapshot does not refer to the storage block. If the storage block is allocated for storing data at the time point of capturing the snapshot and the data in the storage block are deleted subsequently (i.e., the storage block becomes an unused storage block), then the storage block may not be reused because the snapshot is referring to the storage block.

The two cases as introduced above are only a determination rule when the file system has one snapshot. When the file system has a plurality of snapshots, snapshot mapping(s) of an unused storage block and whether this storage block has been allocated at a time point of capturing each of the snapshots are determined successively from the latest snapshot based on a time sequence of the snapshots, thereby comprehensively determining whether the storage block can be provided to the storage pool for reuse.

Since the file system may probably have many snapshots, if all snapshots are determined according to the time sequence, much time will be consumed. Besides, since only the snapshot mapping information of the latest snapshot of the file system is stored in cache, while the snapshot mapping information of other snapshots is stored in a storage space of the file system, and as mentioned above, the storage block or the cylinder group including the storage block will be locked in order to ensure normal reads/writes of the file system, it is generally more easy to obtain the snapshot mapping information of the latest snapshot. Based on these reasons, in order to enhance the performance of the process of reusing storage blocks, in some embodiments of the present invention, the latest snapshot may be regarded as having a larger influence on determining whether an unused storage block can be reused. When it cannot be determined whether the storage block can be reused based on the latest snapshot, a next snapshot will then be used to perform determination. Moreover, when the number of snapshots of the file system is too large, only a predetermined number of snapshots may be considered, rather than considering all snapshots of the file system.

Figure 5:
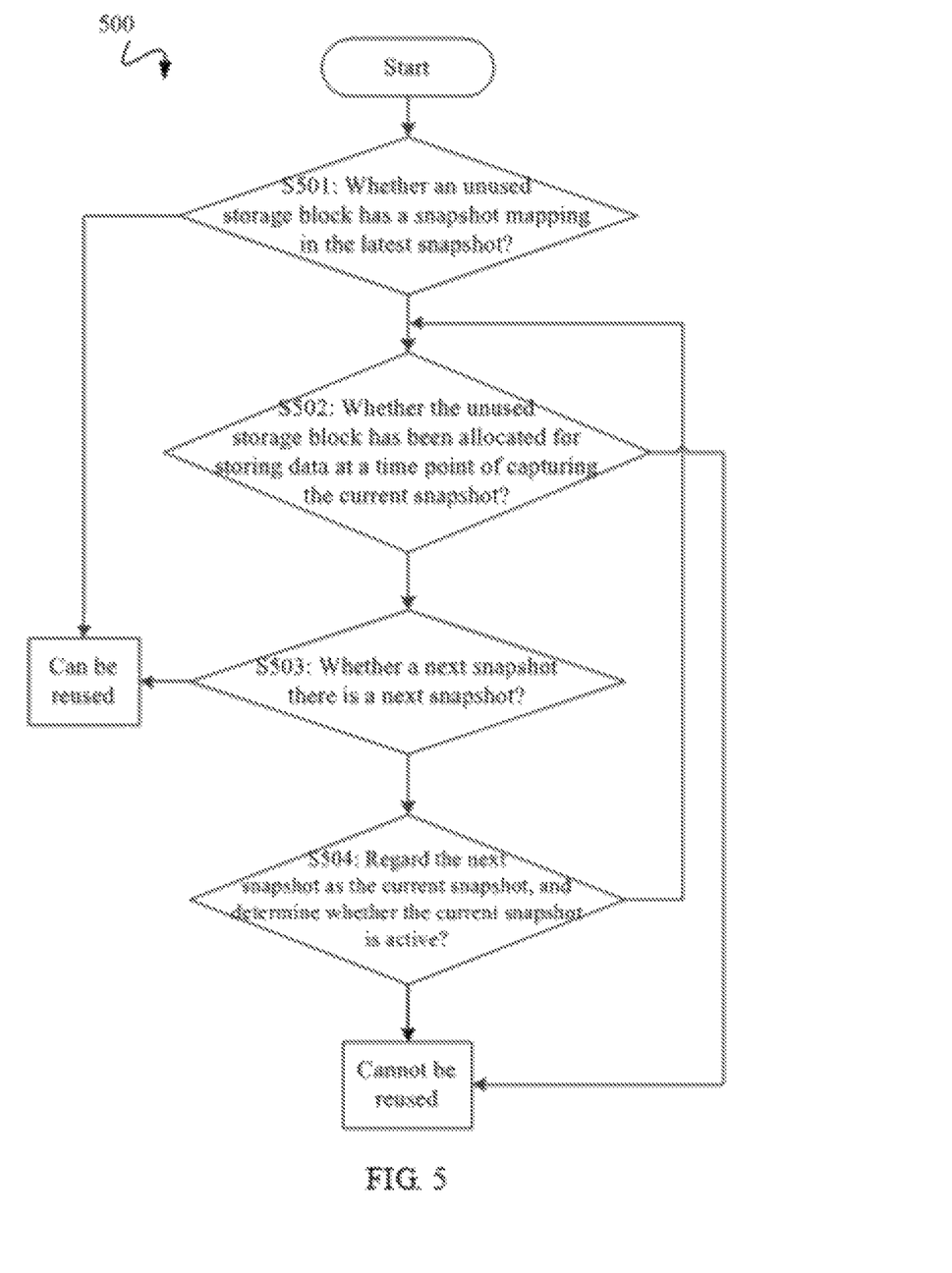
FIG. 5 shows a flowchart of a process of determining whether an unused storage block can be reused according to an embodiment of the present invention.

FIG. 5 shows a flowchart of a process 500 for determining whether an unused storage block can be reused according to an embodiment of the present invention.

At step S501, it is detected whether an unused storage block has a snapshot mapping in the latest snapshot. In particular, all snapshots of the file system may be arranged according to a time sequence of capturing the snapshots and the latest snapshot may then be determined.

If it is detected at step S501 that the storage block has a snapshot mapping in the snapshot, it indicates that the data applied by the latest snapshot in the storage block have been mapped to a further storage block designated by this snapshot, as mentioned above. Therefore, the storage block can be reused without continuing to detect other snapshots, and the process 500 ends.

If it is detected at step S501 that the storage block has no snapshot mapping, then the process 500 proceeds to step S502. At step S502, it is detected whether the unused storage block has been allocated for storing data at a time point of capturing the current snapshot. The information regarding whether the storage block is allocated for storing data at a certain time point is recorded by the file system. Therefore, it may be determined by checking the information whether the storage block is allocated for storing data at the time point of capturing the current snapshot.

As mentioned above, if it is detected at step S501 that the storage block has no snapshot mapping and it is detected at step S502 that the storage block is allocated for storing data at a time point of capturing the current snapshot, i.e., the storage block is referred by the current snapshot and the data in the storage block are not mapped into other storage blocks, the storage block cannot be reused so as to ensure normal operations of the snapshot function of the file system. At this point, the process 500 ends.

If it is detected at step S502 that the storage block is not allocated for storing data at the time point of capturing the current snapshot, the process 500 proceeds to step S503 to determine whether there is a next snapshot (i.e., a snapshot that is captured at a time point before the time point of the current snapshot). If there is one, the process 500 proceeds to step S504 to regard the next snapshot as a current snapshot and determine whether the current snapshot is active. The active state of the current snapshot indicates that the snapshot is accessible and the information of the storage block, for example, the information about whether the storage block is allocated for storing data at the time point of capturing the snapshot, can be checked.

If it is determined that the current snapshot is inactive, in order to ensure the normal operations of the snapshot function of the file system, it is determined that the storage block cannot be reused, and the process 500 ends.

If it is determined that the current snapshot is active, the process 500 returns back to step S502.

If it is determined at step S503 that there is no next snapshot, i.e., the current snapshot is the last snapshot of the file system, it is determined that the unused storage block cannot be reused, and the process 500 ends. In other words, the storage block is not allocated for storing data at time points of capturing all the existing snapshots in the file system; thus the storage block is not referred by the snapshots and can be reused.

Since the file system may probably have many snapshots, a rather long time might be taken to determine whether an unused storage block can be reused according to the process 500. Therefore, in some embodiments, in order to improve the decision speed and enhance system performance, only a predetermined number of snapshots in the file system may be considered. For example, only the latest 16 snapshots of the file system may be considered. In other words, in step S503, if the current snapshot is a snapshot with a predetermined number among all snapshots of the file system after being sorted according to a time sequence, e.g., the $16^{th}$ snapshot, then it is determined that the unused storage block cannot be reused without continuing detecting other snapshots.

It should be noted that for each unused storage block in the file system having snapshots, the process 500 may be used to determine whether the storage block can be reused.

An example process of determining whether an unused storage block can be reused in a file system having snapshots has been described above with reference to FIG. 5. It should be noted that the process 500 is only an example. Various steps described in the process 500 may be executed in a different order, and/or executed in parallel. For example, the order of steps 501 and 502 may be exchanged. For another example, if it is determined at step 504 that the current snapshot is active, then the process 500 returns back to step 501. That is, it may be detected for each snapshot whether the storage block has a mapping and is allocated for storing data at a corresponding time point of capturing. Besides, the process 500 may comprise additional steps and/or execution of some shown steps may be omitted. For example, the step S504 may be omitted, i.e., not to consider whether the snapshot is active. In this example, if it is determined at step S503 that there is a next snapshot, then the next snapshot acts as a current snapshot, and the process directly returns to step S502 from step S503.

The spirit and principle of the present invention have been illustrated above with reference to several specific embodiments. Through various embodiments of the present invention, an unused storage block is detected by scanning a storage space of a file system. When an unused storage block is detected, the storage block will be returned back into a storage pool, such that this storage block can be reused by all file systems that share the storage pool. Therefore, effective utilization of the storage space of the storage pool is achieved. The process of reclaiming storage blocks of the file system may be automatically triggered according to a predetermined trigger policy, so as to timely and quickly reuse the idle storage blocks. In addition, the process will not affect the normal read/write operations of the file system. This process is also suitable for a file system having a snapshot function, which avoids the impact on storage snapshots due to returning the storage blocks into the storage pool.

Figure 6:
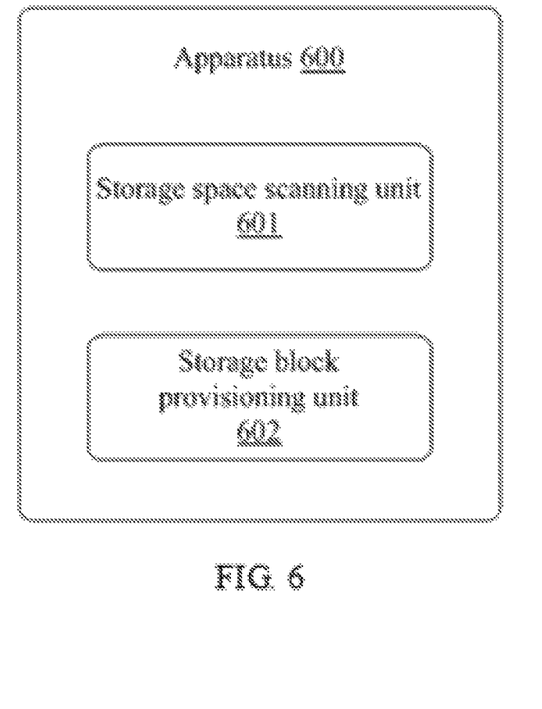
FIG. 6 shows a block diagram of an apparatus for reusing a storage block of a file system according to an embodiment of the present invention.

FIG. 6 shows a block diagram of an apparatus for reusing a storage block of a file system 600 according to an embodiment of the present invention. The file system is based on a thin provision storage configuration and shares a storage pool with a further file system. As shown in FIG. 6, the apparatus 600 comprises a storage space scanning unit 601 configured to detect an unused storage block in a storage space of the file system in response to a predefined trigger event. The apparatus 600 further comprises a storage block provisioning unit 602 configured to, in response to an unused storage block being detected in the storage space, provide the unused storage block to the storage pool for being reused.

In one embodiment of the present invention, the predefined trigger event includes at least one of a user scanning request, time expiration trigger, and storage threshold trigger, the storage threshold trigger being based on at least one of a maximum storage use amount and a current storage use amount of the file system.

In one embodiment of the present invention, the apparatus 600 further comprises an updating unit configured to update the maximum storage use amount of the file system after the unused storage block is provided to the storage pool.

In one embodiment of the present invention, the storage space scanning unit 601 is further configured to scan the storage space of the file system using a plurality of predefined threads in parallel so as to detect the unused storage block.

In one embodiment of the present invention, the storage block provisioning unit 602 is further configured to demap the unused storage block from the file system and provide the demapped storage block to the storage pool.

In one embodiment of the present invention, the apparatus 600 further comprises a storage block locking unit configured to lock the unused storage block with respect to the file system before providing the unused storage block to the storage pool.

In one embodiment, the file system supports a snapshot function. In this embodiment, the apparatus 600 further comprises a reuse determining unit configured to, in response to the file system having at least one snapshot, determine whether the unused storage block can be reused based on the at least one snapshot before providing the unused storage block to the storage pool.

In one embodiment of the present invention, the reuse determining unit comprises a snapshot mapping detecting unit configured to detect whether the unused storage block has a snapshot mapping in the latest snapshot based on a time sequence of the at least one snapshot, the snapshot mapping indicating that data in the unused storage block has been mapped to a further storage block after the snapshot is captured. The reuse determining unit further comprises a first determining unit configured to determine that the unused storage block can be reused without continuing to detect other snapshots when it is detected that the unused storage block has a snapshot mapping.

In one embodiment of the present invention, the reuse determining unit further comprises a storage data detecting unit configured to detect whether the unused storage block is allocated for storing data at a time point of capturing the snapshot when it is detected that the unused storage block has no snapshot mapping. The reuse determining unit further comprises a second determining unit configured to, when the unused storage block is assigned with data at the time point of capturing the snapshot, determine that the unused storage block cannot be reused without continuing to detect other snapshots.

In one embodiment of the present invention, the storage data detecting unit is further configured to, when the unused storage block is not assigned with data at the time point of capturing the snapshot, continuously detect whether the unused storage block is allocated for storing data at a time point of capturing a next snapshot.

In one embodiment of the present invention, the reuse determining unit further comprises a third determining unit configured to, when the unused storage block is not assigned with data at the time point of capturing the snapshot and the snapshot is a predetermined snapshot in the at least one snapshot, determine that the unused storage block cannot be reused.

It can be seen that the apparatus 600 of FIG. 6 may implement the method shown in FIG. 3 or FIG. 5. Although not being further illustrated, the apparatus 600 may comprise more functional units to implement various embodiments described in conjunction with the method 300 of FIG. 3 or the process 500 of FIG. 5. Further, the apparatus 600 may implement weighing comprehensively the access hot degree of cached data included in each sub-linked list using the activity degree of each sub-linked list, and upon removal, the cached data with a relatively low access hot degree in the entire system can be removed, while the cached data with a relatively high access hot degree in the entire system may be retained, thereby enhancing the read/write rate of the system.

It should be noted that for the sake of clarity, FIG. 6 does not show optional units or sub-units included in the apparatus 600. All features and operations as described above are suitable for the apparatus 600, respectively. Moreover, partitioning of units or subunits in the apparatus 600 is exemplary, rather than limitative, which is intended to describe their main functions or operations logically. A function of one unit may be implemented by a plurality of other units; on the contrary, a plurality of units may be implemented by one unit. The scope of the present invention is not limited in this regard.

Furthermore, the units included in the apparatus 600 may be implemented by various manners, including software, hardware, firmware, and any combination thereof. For example, in some embodiments, the apparatus may be implemented by software and/or firmware. Alternatively or additionally, the apparatus 600 may be implemented partially or completely based on hardware. For example, one or more units in the apparatus 600 may be implemented as an integrated circuit (IC) chip, an application specific integrated circuit (ASIC), a system on chip (SOC), a field programmable gate array (FPGA), and the like. The scope of the present intention is not limited to this aspect.

The present invention may be a system, a method, and/or a computer program product. The computer program product may include a computer readable storage medium having computer readable program instructions thereon for carrying out various aspects of the present invention.

The computer readable storage medium can be a tangible device that can maintain and store instructions for use by an instruction executable device. The computer readable storage medium may be, for example, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from the computer readable storage medium or to an external computer or external storage device via a network such as the Internet, a local area network, a wide area network and/or a wireless network. The network may comprise copper transmission cables, optical fiber transmission, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in the respective computing/processing device.

Computer readable program instructions for carrying out operations of the present invention may be assemble instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like and conventional procedural programming languages, such as the "C" language or similar programming languages. The computer readable program instructions may be executed completely or partly on the user's computer, executed as a stand-alone software package, executed partly on the user's computer and partly on a remote computer, or executed completely on the remote computer or server. In the scenario related to the remote computer, the remote computer may be connected to the user's computer through any type of network, including a local area network (LAN) or a wide area network (WAN), or may be connected to an external computer (for example, through the Internet connection using an Internet Service Provider). In some embodiments, electronic circuitry including, for example, programmable logic circuitry, field-programmable gate arrays (FPGA), or programmable logic arrays (PLA) may be customized through the use of state information of the computer readable program instructions, which circuitry may carry out the computer readable program instructions so as to perform various aspects of the present invention.

Various aspects of the present invention are described herein with reference to flowcharts and/or block diagrams of the methods, apparatus (systems), and computer program products according to the embodiments of the invention. It will be understood that each and a combination of blocks of the flowcharts and/or block diagrams can be implemented by computer readable program instructions.

These computer readable program instructions may be provided to a processor of a general purpose computer, special purpose computer, or other programmable data processing apparatus so as to produce a machine, such that the instructions, which executed via the processor of the computer or other programmable data processing apparatus, create means for implementing the functions/actions specified in a block or blocks of the flowcharts and/or block diagrams. These computer readable program instructions may also be stored in a computer readable storage medium that can direct a computer, a programmable data processing apparatus, and/or other devices to function in a particular manner, such that the computer readable storage medium having instructions stored thereon comprises an article of manufacture including instructions which implement various aspects of the functions/actions specified in a block or blocks of the flowcharts and/or block diagrams.

The computer readable program instructions may also be loaded onto computers, other programmable data processing apparatus, or other devices to cause a series of operational steps to be performed on the computers, the other programmable apparatus or other devices to produce a computer implemented process, such that the instructions, which executed on the computer, other programmable apparatus, or other device, implement the functions/actions specified in a block or blocks of the flowchart and/or block diagram.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in a reverse order depending upon the functionality involved. It will also be noted that each and a combination of the blocks of the block diagrams and/or flowcharts can be implemented by special purpose hardware-based systems that perform the specified functions or actions, or by a combination of special purpose hardware and computer instructions.

The description of the various embodiments of the present invention has been presented for purposes of illustration, which is not exhaustive or limited to the embodiments disclosed. Many modifications and variations will be apparent to those ordinary skilled in the art without departing from the scope and spirit of the described embodiments. The terminology used herein was chosen to best explain the principles of the embodiments, the practical application or technical improvement over technologies found in the marketplace, or to enable other ordinary skilled in the art to understand the embodiments disclosed herein.

What is claimed is:

1. A computer-executable method for reusing a storage block of a file system, the file system being based on a thin provision storage configuration and sharing a storage pool with a further file system, the computer-executable method comprising:
   detecting an unused storage block in a storage space of the file system in response to a predefined trigger event, wherein the unused storage block is an idle storage block;
   wherein deletion of an amount of data from the storage space is enabled to be the predefined trigger event;
   wherein the unused storage block is not automatically returned back into the storage pool prior to the detecting;
   providing the unused storage block to the storage pool for being reused;
   wherein the file system supports a snapshot function; and
   wherein before providing the unused storage block to the storage pool, the method further comprises:
   in response to the file system having at least one snapshot, determining whether the unused storage block can be reused based on the at least one snapshot.

2. The computer-executable method according to claim 1, wherein the predefined trigger event includes at least one of a user scanning request, time expiration trigger, and storage threshold trigger, the storage threshold trigger being based on at least one of a maximum storage use amount and a current storage use amount of the file system.

3. The computer-executable method according to claim 2, further comprising:
   updating the maximum storage use amount of the file system after the unused storage block is provided to the storage pool.

4. The computer-executable method according to claim 1, wherein detecting an unused storage block in a storage space of the file system comprises:
   scanning the storage space of the file system using a plurality of predefined threads in parallel so as to detect the unused storage block.

5. The computer-executable method of claim 1, wherein providing the unused storage block to the storage pool comprises:
   demapping the unused storage block from the file system; and
   providing the demapped storage block to the storage pool.

6. The computer-executable method of claim 1, wherein before providing the unused storage block to the storage pool, the method further comprises:
   locking the unused storage block with respect to the file system.

7. The computer-executable method of claim 1, wherein determining whether the unused storage block can be reused based on the at least one snapshot comprises:
   detecting whether the unused storage block has a snapshot mapping in a latest snapshot based on a time sequence of the at least one snapshot, the snapshot mapping indicating that data in the unused storage block has been mapped to a further storage block after the latest snapshot is captured; and
   determining that the unused storage block can be reused without continuing to detect other snapshots when it is detected that the unused storage block has the snapshot mapping.

8. The computer-executable method of claim 7, further comprising:
   detecting whether the unused storage block is allocated for storing data at a time point of capturing the latest snapshot when it is detected that the unused storage block has no snapshot mapping;
   when the unused storage block is assigned with data at the time point of capturing the latest snapshot, determining that the unused storage block cannot be reused without continuing to detect other snapshots; and
   when the unused storage block is not assigned with data at the time point of capturing the latest snapshot, continuously detecting whether the unused storage block is allocated for storing data at a time point of capturing a next snapshot.

9. The computer-executable method of claim 8, further comprising:
   when the unused storage block is not assigned with data at the time point of capturing a snapshot and the snapshot is a predetermined snapshot in the at least one snapshot, determining that the unused storage block cannot be reused.

10. A system, comprising:
    a file system, wherein the file system includes a thin provision storage configuration and sharing a storage pool within a further file system;
    computer-executable program logic encoded in memory of one or more computers enabled to manage reusing a storage block of the file system, wherein the computer-executable program logic is configured for the execution of:
    detecting an unused storage block in a storage space of the file system in response to a predefined trigger event, wherein the unused storage block is an idle storage block;
    wherein deletion of an amount of data from the storage space is enabled to be the predefined trigger event;
    wherein the unused storage block is not automatically returned back into the storage pool prior to the detecting;
    providing the unused storage block to the storage pool for being reused;
    wherein the file system supports a snapshot function; and
    wherein before providing the unused storage block to the storage pool, the method further comprises:
    in response to the file system having at least one snapshot, determining whether the unused storage block can be reused based on the at least one snapshot.

11. The system of claim 10, wherein the predefined trigger event includes at least one of a user scanning request, time expiration trigger, and storage threshold trigger, the storage threshold trigger being based on at least one of a maximum storage use amount and a current storage use amount of the file system.

12. The system of claim 11, wherein the computer-executable program logic is further configured for the execution of:
    updating the maximum storage use amount of the file system after the unused storage block is provided to the storage pool.

13. The system of claim 10, wherein detecting an unused storage block in a storage space of the file system comprises:
    scanning the storage space of the file system using a plurality of predefined threads in parallel so as to detect the unused storage block.

14. The system of claim 10, wherein providing the unused storage block to the storage pool comprises:

demapping the unused storage block from the file system; and providing the demapped storage block to the storage pool.

15. The system of claim 10, wherein before providing the unused storage block to the storage pool, the method further comprises:

locking the unused storage block with respect to the file system.

16. The system of claim 10, wherein determining whether the unused storage block can be reused based on the at least one snapshot comprises:

detecting whether the unused storage block has a snapshot mapping in a latest snapshot based on a time sequence of the at least one snapshot, the snapshot mapping indicating that data in the unused storage block has been mapped to a further storage block after the latest snapshot is captured; and determining that the unused storage block can be reused without continuing to detect other snapshots when it is detected that the unused storage block has a snapshot mapping.

17. The system of claim 16, wherein the computer-executable program logic is further configured for the execution of:

detecting whether the unused storage block is allocated for storing data at a time point of capturing the latest snapshot when it is detected that the unused storage block has no snapshot mapping;

when the unused storage block is assigned with data at the time point of capturing the latest snapshot, determining that the unused storage block cannot be reused without continuing to detect other snapshots; and when the unused storage block is not assigned with data at the time point of capturing the latest snapshot, continuously detecting whether the unused storage block is allocated for storing data at a time point of capturing a next snapshot.

18. A computer program product for reusing a storage block of a file system, the file system being based on a thin provision storage configuration and sharing a storage pool with a further file system, the computer program product comprising:

a non-transitory computer readable medium encoded with computer-executable code, the code configured to enable the execution of:

detecting an unused storage block in a storage space of the file system in response to a predefined trigger event, wherein the unused storage block is an idle storage block;

wherein deletion of an amount of data from the storage space is enabled to be the predefined trigger event;

wherein the unused storage block is not automatically returned back into the storage pool prior to the detecting;

providing the unused storage block to the storage pool for being reused;

wherein the file system supports a snapshot function; and wherein before providing the unused storage block to the storage pool, the method further comprises:

in response to the file system having at least one snapshot, determining whether the unused storage block can be reused based on the at least one snapshot.

* * * * *